US012739781B2

(12) United States Patent
Li

(10) Patent No.: US 12,739,781 B2
(45) Date of Patent: Sep. 15, 2026

(54) POSITIONING METHOD AND APPARATUS

(71) Applicant: Beijing Xiaomi Mobile Software Co., Ltd., Beijing (CN)

(72) Inventor: Xiaolong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 305 days.

(21) Appl. No.: 18/558,918

(22) PCT Filed: May 10, 2021

(86) PCT No.: PCT/CN2021/092876
§ 371 (c)(1),
(2) Date: Nov. 3, 2023

(87) PCT Pub. No.: WO2022/236625
PCT Pub. Date: Nov. 17, 2022

(65) Prior Publication Data

US 2024/0244566 A1 Jul. 18, 2024

(51) Int. Cl.
*H04W 64/00* (2009.01)

(52) U.S. Cl.
CPC .................................. *H04W 64/00* (2013.01)

(58) Field of Classification Search
CPC ..................................................... H04W 64/00
See application file for complete search history.

(56) References Cited

U.S. PATENT DOCUMENTS

2015/0148063 A1* 5/2015 Jung ..................... H04W 48/16 455/456.1
2018/0054796 A1* 2/2018 Edge ...................... H04W 4/02
2020/0068479 A1 2/2020 Jiang et al.

FOREIGN PATENT DOCUMENTS

CN 112203213 A 1/2021
EP 3076727 A1 10/2016

OTHER PUBLICATIONS

Office Action issued by the Russian Federation Federal Institute of Industrial Property on May 17, 2024, in corresponding Application No. RU 2023131357//07, 6 pages.
Extended European Search Report Issued in Application No. 21941201.2 dated May 17, 2024, 11 pages.
International Search Report and Written Opinion of International Application No. PCT/CN2021/092876, dated Oct. 2, 2022, 16 pages.
QualComm Incorporated, “NR Positioning Latency Analysis and Enhancements”, 3GPP TSG-RAN WG2 Meeting #112-e, Electronic, Nov. 2-13, 2020, R2-2010096, 29 pages.
Office Action issued by the Intellectual Property India on Aug. 1, 2025, in corresponding Application No. IN 202347082803, 6 pages.
The First Office Action issued by the State Intellectual Property Office of People’s Republic of China on Jul. 12, 2025, in corresponding Application No. CN 202180001487.3, 13 pages.
Notice of the first review opinion for Japanese Patent Application No. 2023-569610, dated Sep. 27, 2024, 10 pages.

(Continued)

*Primary Examiner* — Justin Y Lee

(74) *Attorney, Agent, or Firm* — Finnegan, Henderson, Farabow, Garrett & Dunner, L.L.P.

(57) ABSTRACT

A positioning method is performed by a core network device. The method includes sending a positioning message, wherein the positioning message includes time information configured to indicate to return response information.

19 Claims, 9 Drawing Sheets

(56) References Cited

OTHER PUBLICATIONS

Huawei, HiSilicon, “Discussion on positioning latency”, 3GPP TSG RAN WG2 #113bis-e, R2-2103541, Electronic, Apr. 12-20, 2021, 5 pages.

CATT, “Consideration on Latency Improvement”, 3GPP TSG-RAN WG3 Meeting #112 electronic, R3-211823, Online, May 17-27, 2021, 11 pages.

Qualcomm Incorporated, “Scheduling Location in Advance to reduce Latency”, 3GPP TSG-RAN WG2 Meeting #113bis-e, R2-2103898, Electronic Meeting, Apr. 12-20, 2021, 9 pages.

* cited by examiner

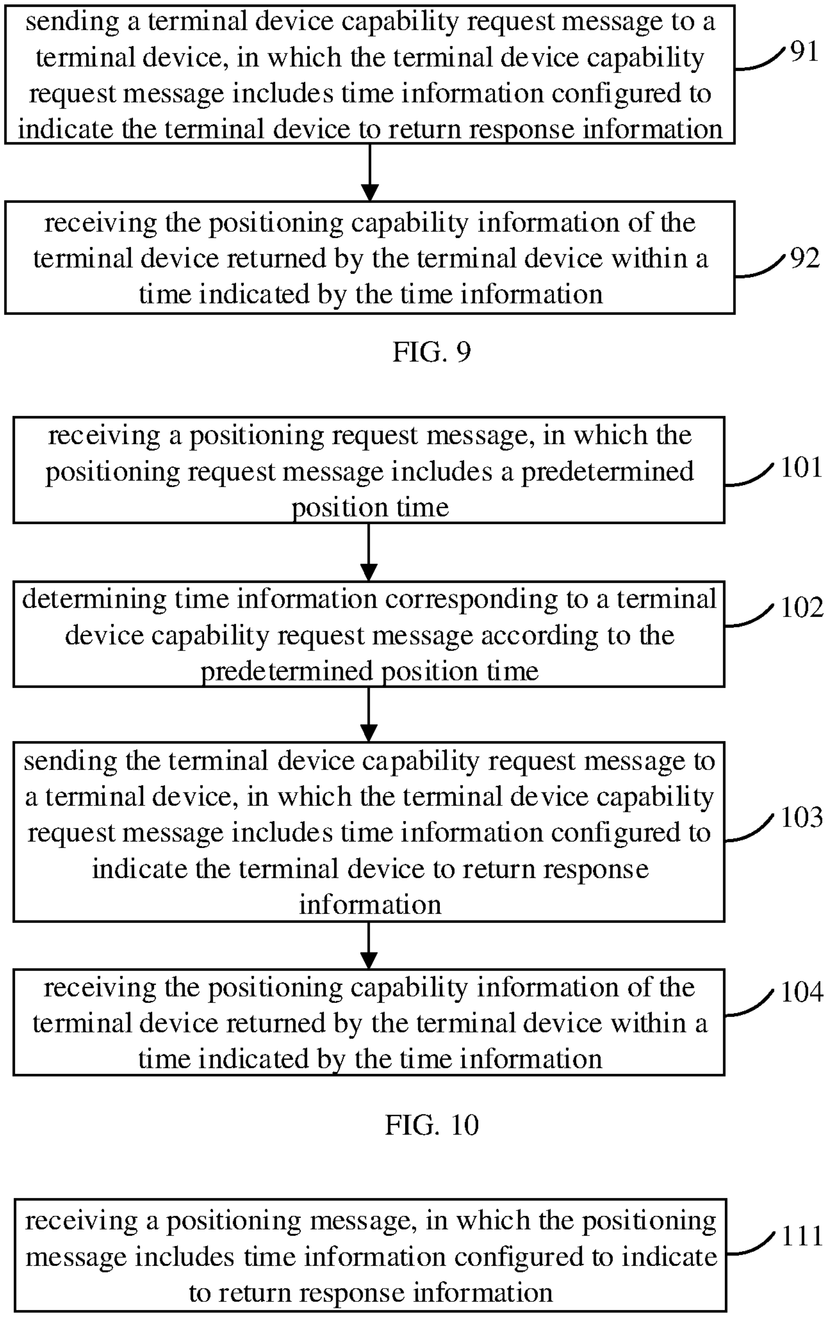
sending a terminal device capability request message to a terminal device, in which the terminal device capability request message includes time information configured to indicate the terminal device to return response information
91
receiving the positioning capability information of the terminal device returned by the terminal device within a time indicated by the time information
92
FIG. 9
receiving a positioning request message, in which the positioning request message includes a predetermined position time
101
determining time information corresponding to a terminal device capability request message according to the predetermined position time
102
sending the terminal device capability request message to a terminal device, in which the terminal device capability request message includes time information configured to indicate the terminal device to return response information
103
receiving the positioning capability information of the terminal device returned by the terminal device within a time indicated by the time information
104
FIG. 10
receiving a positioning message, in which the positioning message includes time information configured to indicate to return response information
111
FIG. 11

POSITIONING METHOD AND APPARATUS

CROSS-REFERENCE TO RELATED APPLICATIONS

This application is a U.S. National Stage Application of International PCT/CN2021/092876, filed May 10, 2021, the contents of which are incorporated herein by reference in their entireties.

TECHNICAL FIELD

The present disclosure relates to the field of communication technology, and more particularly to a positioning method and an apparatus thereof.

BACKGROUND

In a communication system, a terminal device may be positioned through a variety of positioning technologies. A core network device needs to complete positioning preparation works before positioning the terminal device, such as determining a positioning capability of the terminal device, obtaining a sounding reference symbol (SRS) of the terminal device, providing positioning assistance information to the terminal device, etc.

A time required for each of above positioning preparation works is not controlled by the core network device, which may cause the core network device to be unable to complete the preparation works before a prescribed time.

SUMMARY

In a first aspect, embodiments of the present disclosure provide a positioning method, which is performed by a core network device and includes: sending a positioning message. The positioning message includes time information configured to indicate to return response information.

In a second aspect, embodiments of the present disclosure provide a positioning method, which is performed by an access network device and includes:

- receiving a positioning message, in which the positioning message includes time information configured to indicate to return response information.

In a third aspect, embodiments of the present disclosure provide a positioning method, which is performed by a terminal device and includes:

receiving a positioning message, in which the positioning message includes time information configured to indicate to return response information.

BRIEF DESCRIPTION OF THE DRAWINGS

The drawings of the present disclosure will be briefly described below.

FIG. 2 is a schematic flowchart of a positioning method provided by embodiments of the present disclosure.

FIG. 3 is a schematic flowchart of a positioning method provided by embodiments of the present disclosure.

FIG. 9 is a schematic flowchart of a positioning method provided by embodiments of the present disclosure.

FIG. 10 is a schematic flowchart of a positioning method provided by embodiments of the present disclosure.

FIG. 11 is a schematic flowchart of a positioning method provided by embodiments of the present disclosure.

DETAILED DESCRIPTION

For ease of understanding, terms involved in the present disclosure are introduced first.

1. Long Term Evolution (LTE) Positioning Protocol (LPP) Message

As a universal positioning communication protocol, a main function of an LPP is to exchange positioning assistance data and positioning information between a network and a terminal. In fact, it may be used in both a control plane and a data plane.

The LPP message may be used for a message transmission between a core network device and a terminal device.

2. New Radio Positioning Protocol a (NRPPa) Message

An NRPPa is a protocol configured to standardize a control plane wireless network layer signaling process between a base station and a location management function (LMF) device. The NRPPa messages between the LMF device and a gNB may be classified into: a non-UE associated message and a UE associated message.

The non-UE associated message may be used to transmit TRP information, measurement information, assistance information or the like between the base station and the LMF device. The UE associated message may be used to transmit specified UE associated information between the base station and the LMF device, such as TRP configuration information of the terminal device.

Embodiments of the present disclosure provide a positioning method and an apparatus, which may be applied to a positioning service in a communication system. A core network device sends a positioning message containing time information to indicate an access network device or a terminal device to return response information to the core network device within a time indicated by the time information. Therefore, a time of each stage in a positioning process is controlled by the core network device, so that the core network device may complete positioning preparation works within a prescribed time range and reduce a positioning delay.

In order to better understand a positioning method described in embodiments of the present disclosure, a communication system to which embodiments of the present disclosure are applicable is firstly described below.

Figure 1:
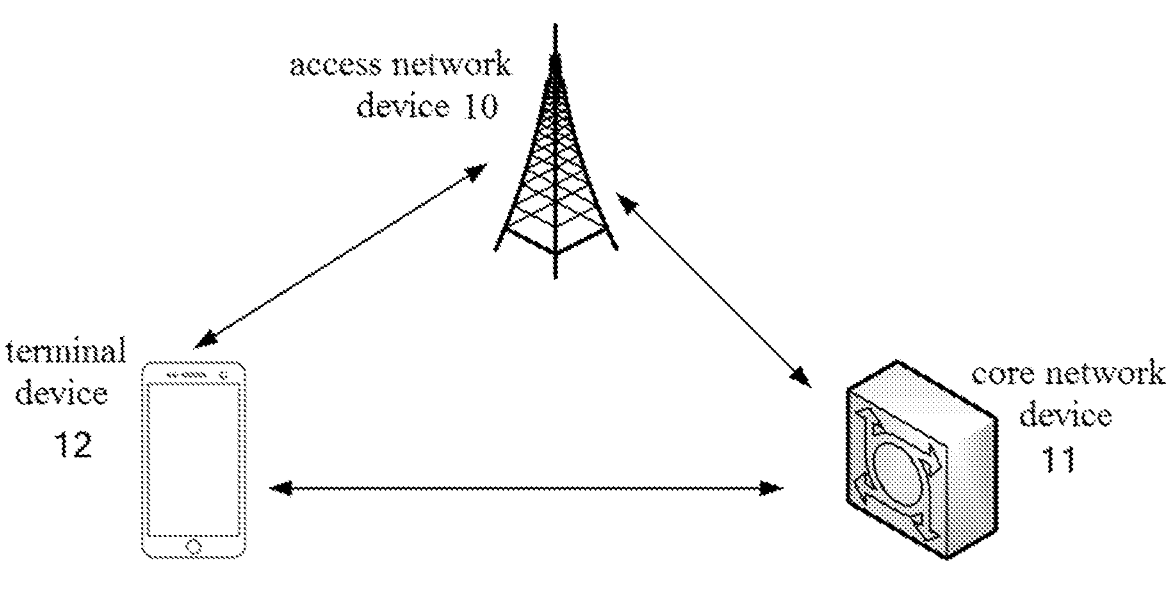
FIG. 1 is a schematic architecture diagram of a communication system provided by embodiments of the present disclosure.

FIG. 1 is a schematic architecture diagram of a communication system provided by embodiments of the present disclosure. Referring to FIG. 1, the communication system may include, but is not limited to, a core network device, an access network device, and a terminal device. The number and forms of the devices shown in FIG. 1 are only as an example and do not constitute a limitation on embodiments of the present disclosure. The communication system may include two or more access network devices, two or more terminal devices, and two or more core network devices in practical applications. As an example for illustration, the communication system shown in FIG. 1 includes one core network device 11, one terminal device 12 and one access network device 10.

It should be noted that the technical solutions of embodiments of the present disclosure may be applied to various communication systems, for example, a long term evolution (LTE) system, a 5th generation (5G) mobile communication system, a 5G new radio (NR) system, or other future new mobile communication systems. The access network device 10 in embodiments of the present disclosure is an entity on a network side for sending or receiving signals. For example, the access network device 10 may be an evolved NodeB (eNB), a next generation NodeB (gNB) in a NR system, a base station in other future mobile communication systems, or an access node in a wireless fidelity (WiFi) system. The specific technology and specific device form adopted by the access network device are not limited in embodiments of the present disclosure.

The core network device 11 and the access network device 10 provided by embodiments of the present disclosure may be composed of a central unit (CU) and distributed units (DU). The CU may also be called a control unit. Using the CU-DU structure allows to split a protocol layer of the network device, such as the base station, so that some of functions of the protocol layer is centrally controlled in the CU, some or all of the remaining functions of the protocol layer are distributed in the DUs, and the CU centrally controls the DUs.

The terminal device 12 in embodiments of the present disclosure is an entity on a user side for receiving or sending signals, such as a mobile phone. The terminal device may also be called a terminal, a user equipment (UE), a mobile station (MS), a mobile terminal (MT), and so on. The terminal device may be a device with a communication function, such as a car, a smart car, a mobile phone, a wearable device, a tablet Pad, a computer with a wireless transceiving function, a virtual reality (VR) terminal device, an augmented reality (AR) terminal device, a wireless terminal device in an industrial control, a wireless terminal device in a self-driving, a wireless terminal device in a remote medical surgery, a wireless terminal device in a smart grid, a wireless terminal device in a transportation safety, a wireless terminal device in a smart city, a wireless terminal device in a smart home, etc. The specific technology and the specific device form adopted by the terminal device are not limited in embodiments of the present disclosure.

It can be understood that the communication system described in embodiments of the present disclosure is intended to illustrate the technical solutions of embodiments of the present disclosure more clearly, and does not constitute a limitation on the technical solutions provided by embodiments of the present disclosure. Those of ordinary skill in the art will know that with an evolution of a system architecture and an emergence of a new service scenario, the technical solutions provided by embodiments of the present disclosure are also applicable to similar technical problems.

A positioning method and apparatus provided by the present disclosure will be introduced in detail below with reference to the accompanying drawings.

Referring to FIG. 2, which is a schematic flowchart of a positioning method provided by embodiments of the present disclosure, the method is performed by a core network device. As shown in FIG. 2, the method may include, but is not limited to, a following step.

In step 21, a positioning message is sent, in which the positioning message includes time information configured to indicate to return response information.

The positioning message may be sent by the core network device to an access network device, or may be sent by the core network device to a terminal device, which is not limited in the present disclosure.

The core network device may be an LMF device, which is not limited in the present disclosure.

In some embodiments, the time information is any one of: a moment or a time duration.

That is, the core network device may indicate a moment when the access network device or the terminal device returns the response information. For example, the time information is moment $t_1$, which indicates that the access network device or the terminal device returns the response information before the moment $t_1$.

Alternatively, the core network device may also indicate the access network device or the terminal device to start timing from a moment when receiving the positioning message sent by the core network device, and return the response information within the time duration indicated by the time information. For example, the time information is time duration $t_2$, and a moment when the access network device or the terminal device receives the positioning message is $t_3$, then the access network device or the terminal device needs to return the response information before moment $t_3+t_2$.

In some embodiments, the positioning message is any one of following messages: a terminal device capability request message; a positioning measurement result request message; a positioning information request message; and a positioning activation request message.

The terminal device capability request message is a message that is sent by the core network device to the terminal device, and used to obtain positioning capability information of the terminal device, such as an LPP message: LPP request capabilities.

The positioning information request message is a message that is sent by the core network device to the access network device, and used to obtain uplink positioning reference signal configuration information corresponding to a specified terminal device, such as an NRPPa message: a positioning information request.

The positioning activation request message is a message that is sent by the core network device to the access network device, and used to trigger the access network device to send an activation indication to the terminal device to activate an uplink positioning reference signal specified in the terminal device, or indicate the access network device to send a deactivation indication to the terminal device to deactivate an uplink positioning reference signal specified in the terminal device, for example: the NRPPa message: a positioning activation request, in case that the uplink positioning reference signal configuration information obtained by the core network device is aperiodic or semi-persistent.

The positioning measurement result request message is a message that is sent by the core network device to the access network device, and used to obtain an uplink positioning reference signal measurement result, such as the NRPPa message: a measurement request.

By implementing embodiments of the present disclosure, the core network device indicates the access network device or the terminal device to return the response information to the core network device within a time indicated by the time information by sending a positioning message containing the time information. Therefore, a time of each stage in a positioning process is controlled by the core network device, so that the core network device may complete positioning preparation works within a prescribed time range and reduce a positioning delay.

Referring to FIG. 3, which is a schematic flowchart of another positioning method provided by embodiments of the present disclosure, the method is performed by a core network device. As shown in FIG. 3, the method may include, but is not limited to, the following steps.

In step 31, a positioning request message is received, in which the positioning request message includes a predetermined position time.

The positioning request message may be sent to the core network device by a terminal device, a positioning service agent, or an application function (AF). The predetermined position time is a positioning measurement result time of a desired target terminal device, that is, the target terminal performs a positioning measurement at this time, and/or a base station performs a positioning measurement on the target terminal at this time. For example, the predetermined position time is a scheduled location time. The predetermined position time may be a moment or may be a time duration, which is not limited in the present disclosure.

In step 32, the time information is determined according to the predetermined position time.

The time information may be a moment or may be a time duration, which is not limited in the present disclosure.

Specifically, after receiving a positioning request message containing the predetermined position time, the core network device may determine time information corresponding to each positioning preparation process according to a process required by the positioning preparation work and the predetermined position time.

In some embodiments, the core network device may determine the time information according to the predetermined position time and a moment when the positioning request message is received.

For example, if the moment when the positioning request message is received is $t_m$, and the predetermined position time is time duration n, then the core network device may determine that it needs to return positioning information before moment $t_m$+n, thereby determining the time information corresponding to each positioning preparation process.

Alternatively, if the moment when the positioning request message is received is $t_m$, and the predetermined position time is moment $t_n$, then the core network device may determine that it needs to return positioning information before the moment $t_n$. That is, it needs to complete each positioning preparation process within a time period of $t_n-t_m$, thereby determining the time information corresponding to each positioning preparation process.

It should be noted that the above examples are only illustrations and cannot be used to limit the time information in embodiments of the present disclosure.

In some embodiments, the core network device may also determine the time information according to the predetermined position time and a type of the positioning message.

In the present disclosure, the positioning message may be sent by the core network device to an access network device, or may be sent to the terminal device. Different protocols may be used by different types of positioning messages, so their corresponding data compression methods may be different, so that a time duration used when the access network device or the terminal device processes the respective message may be different. Therefore, the core network device may determine the time information according to the type of the positioning message and the predetermined position time in the present disclosure.

For example, corresponding time information when the positioning message is a terminal device capability request message is different from corresponding time information when the positioning message is a positioning information request message. Alternatively, corresponding time information when the positioning message is a terminal device capability request message is different from corresponding time information when the positioning message is a positioning activation request message.

It should be noted that when the positioning message is any one of the terminal device capability request message, a positioning measurement result request message, the positioning information request message and the positioning activation request message, corresponding time information may be the same or different.

In step 33, the positioning message is sent, in which the positioning message includes time information configured to indicate to return response information.

For specific implementation forms of the positioning message sent by the core network device and the type of the positioning message, reference may be made to the detailed descriptions of other embodiments of the present disclosure, which will not be described again here.

By implementing embodiments of the present disclosure, the core network device determines the time information contained in the positioning message according to a received positioning request message containing the predetermined position time, so that both the access network device and the terminal device may return the response information within a time indicated by the time information. Therefore, the core network device may complete positioning preparation works within the predetermined position time, and reduce a positioning delay.

Figure 4:
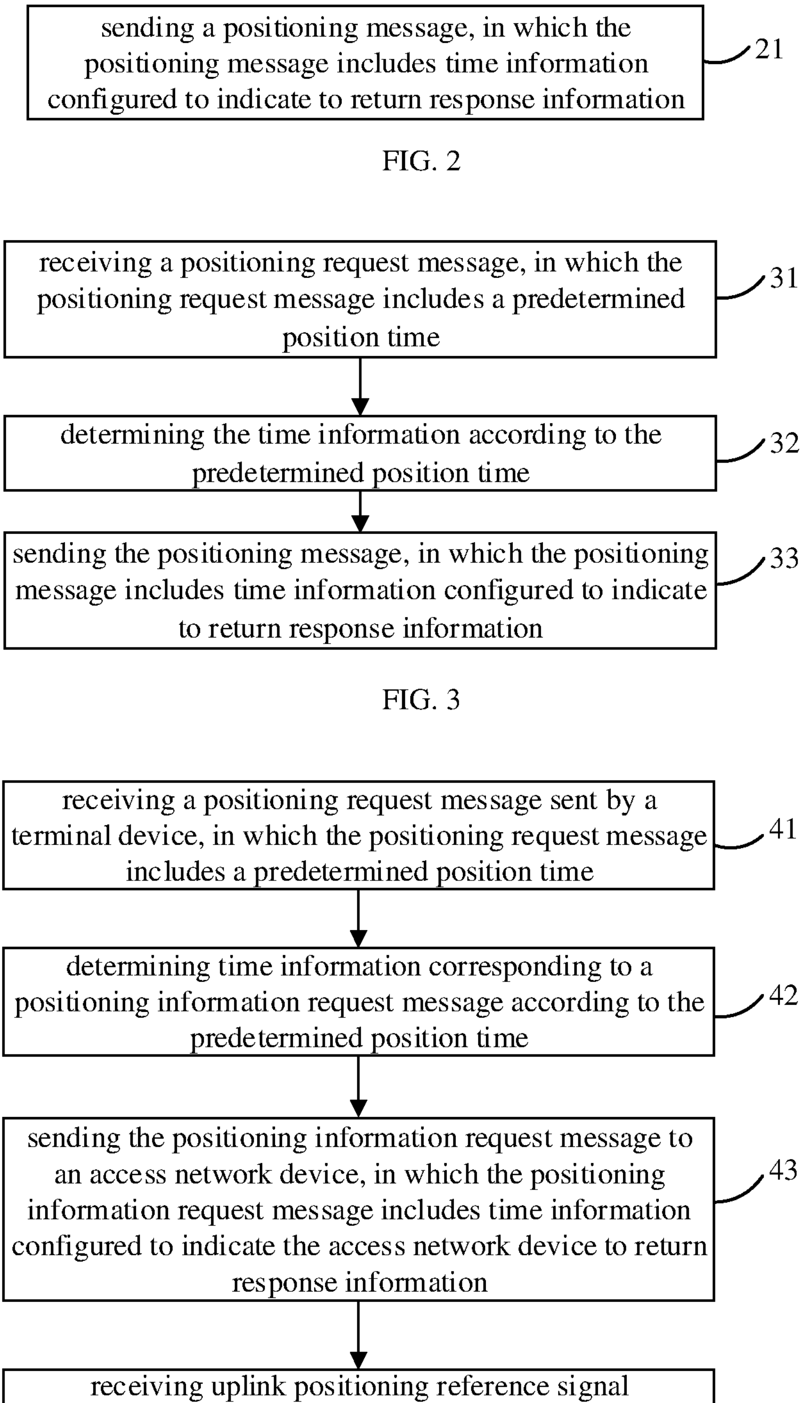
FIG. 4 is a schematic flowchart of a positioning method provided by embodiments of the present disclosure.

Referring to FIG. 4, which is a schematic flowchart of another positioning method provided by embodiments of the present disclosure, the method is performed by a core network device. As shown in FIG. 4, the method may include, but is not limited to, the following steps.

In step 41, a positioning request message sent by a terminal device is received, in which the positioning request message includes a predetermined position time.

In step 42, time information corresponding to a positioning information request message is determined according to the predetermined position time.

For specific implementation forms of the above steps 41 and 42, reference may be made to the detailed descriptions of other embodiments of the present disclosure, which will not be described again here.

In step 43, the positioning information request message is sent to an access network device, in which the positioning information request message includes time information configured to indicate the access network device to return response information.

The positioning information request message is a message that is sent by the core network device to the access network device, and used to obtain uplink positioning reference signal configuration information corresponding to a specified terminal device. The core network device may send the positioning information request message to the access network device via an NRPPa message.

The time information may be a moment or may be a time duration, which is not limited in the present disclosure.

In step 44, uplink positioning reference signal configuration information corresponding to the specified terminal device and returned by the access network device within a time indicated by the time information is received, in which the specified terminal device is a terminal device indicated in the positioning information request message.

The access network device may use the NRPPa message to return the uplink positioning reference signal configuration information corresponding to the specified terminal device to the core network device.

For a specific implementation form of this step, reference may be made to the detailed descriptions of other embodiments of the present disclosure, which will not be described again here.

By implementing embodiments of the present disclosure, the core network device determines the time information corresponding to the positioning information request message according to a received positioning request message containing the predetermined position time, then sends the positioning information request message containing the time information to the access network device, and receives the uplink positioning reference signal configuration information corresponding to the specified terminal device returned by the access network device within the time indicated by the time information. Therefore, the core network device may complete positioning preparation works within the predetermined position time, and reduce a positioning delay.

Figures 5, 6:
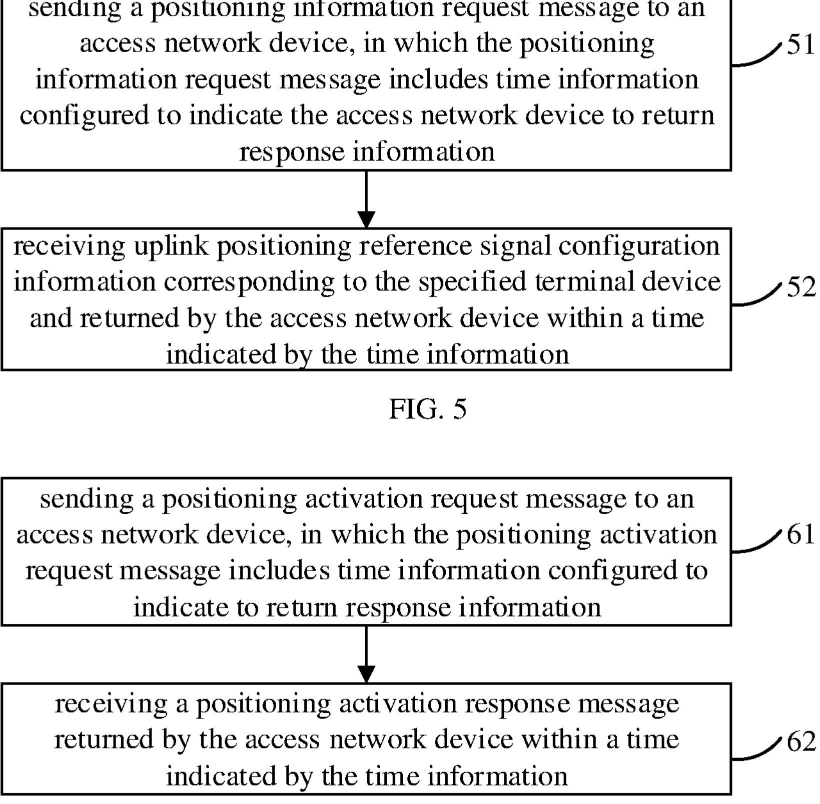
FIG. 5 is a schematic flowchart of a positioning method provided by embodiments of the present disclosure.
FIG. 6 is a schematic flowchart of a positioning method provided by embodiments of the present disclosure.

Referring to FIG. 5, which is a schematic flowchart of another positioning method provided by embodiments of the present disclosure, the method is performed by a core network device. As shown in FIG. 5, the method may include, but is not limited to, the following steps.

In step 51, a positioning information request message is sent to an access network device, in which the positioning information request message includes time information configured to indicate the access network device to return response information.

The positioning information request message is a message that is sent by the core network device to the access network device, and used to obtain uplink positioning reference signal configuration information corresponding to a specified terminal device. The core network device may send the positioning information request message to the access network device via an NRPPa message.

The time information may be a moment or may be a time duration, which is not limited in the present disclosure.

In step 52, uplink positioning reference signal configuration information corresponding to the specified terminal device and returned by the access network device within a time indicated by the time information is received.

The specified terminal device is a terminal device indicated in the positioning information request message.

The access network device may use the NRPPa message to return the uplink positioning reference signal configuration information corresponding to the specified terminal device to the core network device.

For a specific implementation form of this step, reference may be made to the detailed descriptions of other embodiments of the present disclosure, which will not be described again here.

By implementing embodiments of the present disclosure, the core network device sends the positioning information request message containing the time information to the access network device, and receives the uplink positioning reference signal configuration information corresponding to the specified terminal device returned by the access network device within the time indicated by the time information. Therefore, the core network device may complete positioning preparation works within a predetermined position time, and reduce a positioning delay.

Referring to FIG. 6, which is a schematic flowchart of another positioning method provided by embodiments of the present disclosure, the method is performed by a core network device. As shown in FIG. 6, the method may include, but is not limited to, the following steps.

In step 61, a positioning activation request message is sent to an access network device, in which the positioning activation request message includes time information configured to indicate to return response information.

The positioning activation request message is a message that is sent by the core network device to the access network device, and used to trigger the access network device to send an activation indication to a terminal device to activate an uplink positioning reference signal specified in the terminal device, or indicate the access network device to send a deactivation indication to a terminal device to deactivate an uplink positioning reference signal specified in the terminal device, in case that uplink positioning reference signal configuration information obtained by the core network device is aperiodic or semi-persistent.

The core network device may send the positioning activation request message to the access network device via an NRPPa message.

In step 62, a positioning activation response message returned by the access network device within a time indicated by the time information is received.

The positioning activation response message is a message that is returned by the access network device to the core network device, and used to feed back whether to activate or deactivate the uplink positioning reference signal specified in the terminal device.

By implementing embodiments of the present disclosure, the core network device sends the positioning activation request message containing the time information to the access network device, and receives the positioning activation response message returned by the access network device within the time indicated by the time information. Therefore, the core network device may complete positioning preparation works within a predetermined position time, and reduce a positioning delay.

Figures 7, 8:
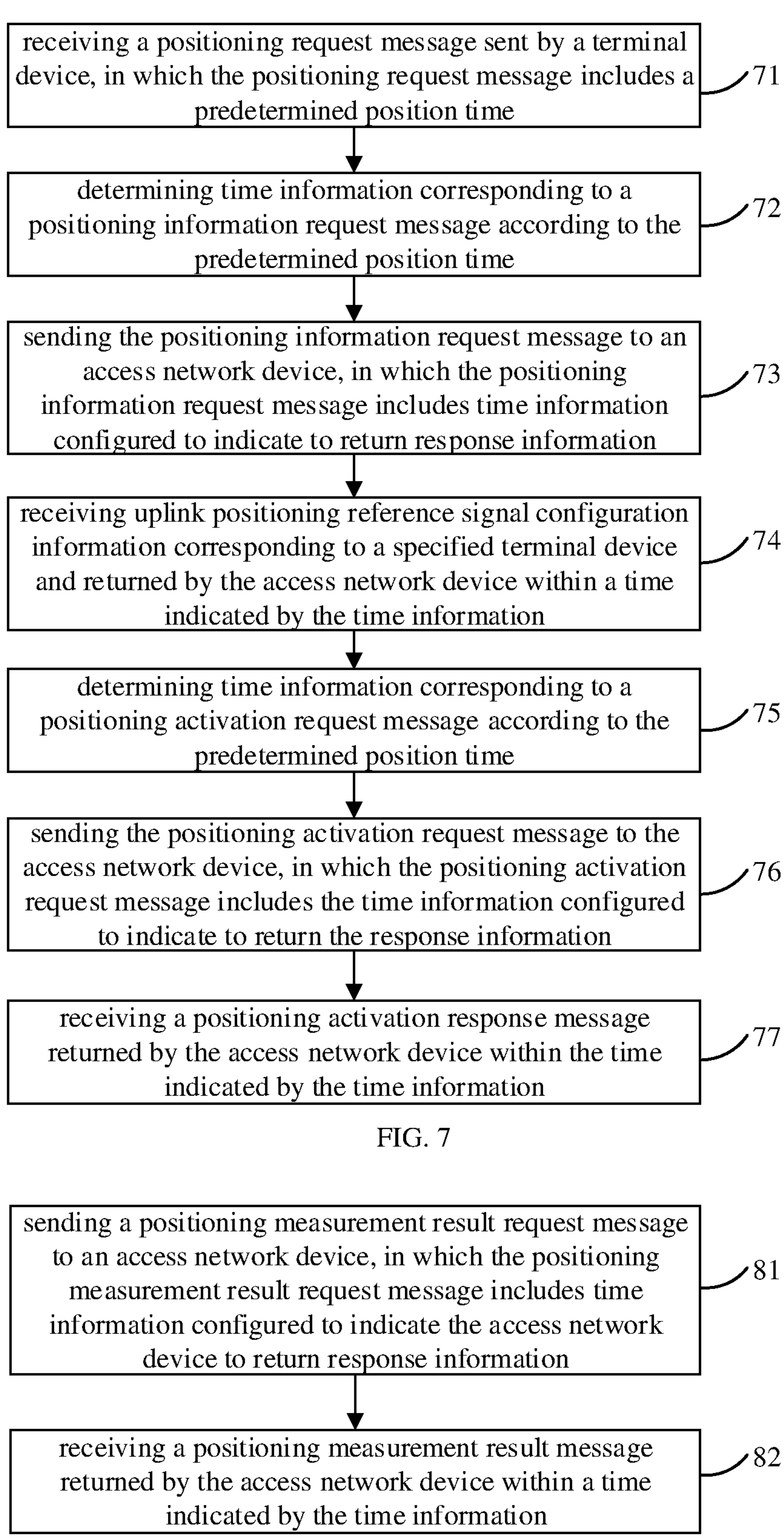
FIG. 7 is a schematic flowchart of a positioning method provided by embodiments of the present disclosure.
FIG. 8 is a schematic flowchart of a positioning method provided by embodiments of the present disclosure.

Referring to FIG. 7, which is a schematic flowchart of another positioning method provided by embodiments of the present disclosure, the method is performed by a core network device. As shown in FIG. 7, the method may include, but is not limited to, the following steps.

In step 71, a positioning request message sent by a terminal device is received, in which the positioning request message includes a predetermined position time.

In step 72, time information corresponding to a positioning information request message is determined according to the predetermined position time.

In step 73, the positioning information request message is sent to an access network device, in which the positioning information request message includes time information configured to indicate to return response information.

In step 74, uplink positioning reference signal configuration information corresponding to a specified terminal device and returned by the access network device within a time indicated by the time information is received.

The specified terminal device is a terminal device indicated in the positioning information request message.

For specific implementation forms of the above steps 71 to 74, reference may be made to the detailed descriptions of other embodiments of the present disclosure, which will not be described again here.

In step 75, time information corresponding to a positioning activation request message is determined according to the predetermined position time.

The time information may be a moment or may be a time duration, which is not limited in the present disclosure.

In embodiments of the present disclosure, the time information corresponding to the positioning information request message and the time information corresponding to the positioning activation request message may be the same or different.

For a specific implementation form of this step, reference may be made to the detailed descriptions of other embodiments of the present disclosure, which will not be described again here.

In step 76, the positioning activation request message is sent to the access network device, in which the positioning activation request message includes the time information configured to indicate to return the response information.

The positioning activation request message is a message that is sent by the core network device to the access network device, and used to trigger the access network device to send an activation indication to the terminal device to activate an uplink positioning reference signal specified in the terminal device, or indicate the access network device to send a deactivation indication to the terminal device to deactivate an uplink positioning reference signal specified in the terminal device, in case that the uplink positioning reference signal configuration information obtained by the core network device is aperiodic or semi-persistent.

The core network device may send the positioning activation request message to the access network device via an NRPPa message.

In step 77, a positioning activation response message returned by the access network device within the time indicated by the time information is received.

The positioning activation response message is a message that is returned by the access network device to the core network device, and used to feed back whether to activate or deactivate the uplink positioning reference signal specified in the terminal device.

By implementing embodiments of the present disclosure, the core network device determines the time information corresponding to the positioning information request message according to a received positioning request message containing the predetermined position time, then sends the positioning information request message containing the time information to the access network device, receives the uplink positioning reference signal configuration information corresponding to the specified terminal device returned by the access network device within the time indicated by the time information, and finally sends the positioning activation request message containing the time information to the access network device, and receives the positioning activation response message returned by the access network device within the time indicated by the time information. Therefore, the core network device may complete positioning preparation works within a predetermined position time, and reduce a positioning delay.

Referring to FIG. 8, which is a schematic flowchart of another positioning method provided by embodiments of the present disclosure, the method is performed by a core network device. As shown in FIG. 8, the method may include, but is not limited to, the following steps.

In step 81, a positioning measurement result request message is sent to an access network device, in which the positioning measurement result request message includes time information configured to indicate the access network device to return response information.

The time information may be a moment or may be a time duration, which is not limited in the present disclosure.

The positioning measurement result request message is a message that is sent by the core network device to the access network device, and used to obtain an uplink positioning reference signal measurement result.

In step 82, a positioning measurement result message returned by the access network device within a time indicated by the time information is received.

The access network device may use an NRPPa message to return the positioning measurement result message to the core network device.

By implementing embodiments of the present disclosure, the core network device sends a positioning measurement result request message containing the time information to the access network device, and receives the positioning measurement result message returned by the access network device within the time indicated by the time information. Therefore, the core network device may complete positioning preparation works within a predetermined position time, and reduce a positioning delay.

Referring to FIG. 9, which is a schematic flowchart of another positioning method provided by embodiments of the present disclosure, the method is performed by a core network device. As shown in FIG. 9, the method may include, but is not limited to, the following steps.

In step 91, a terminal device capability request message is sent to a terminal device, in which the terminal device capability request message includes time information configured to indicate the terminal device to return response information.

The time information may be a moment or may be a time duration, which is not limited in the present disclosure.

The terminal device capability request message is a message that is sent by the core network device to the terminal device, and used to obtain positioning capability information of the terminal device. The core network device may send the terminal device capability request message to the terminal device via an LPP message.

In step 92, the positioning capability information of the terminal device returned by the terminal device within a time indicated by the time information is received.

The terminal device may use the LPP message to return the positioning capability information of the terminal device to the core network device.

By implementing embodiments of the present disclosure, the core network device sends a terminal device capability request message containing the time information to the terminal device, and receives the positioning capability information of the terminal device returned by the terminal device within the time indicated by the time information. Therefore, the core network device may complete positioning preparation works within a predetermined position time, and reduce a positioning delay.

Referring to FIG. 10, which is a schematic flowchart of another positioning method provided by embodiments of the present disclosure, the method is performed by a core network device. As shown in FIG. 10, the method may include, but is not limited to, the following steps.

In step 101, a positioning request message is received, in which the positioning request message includes a predetermined position time.

In step 102, time information corresponding to a terminal device capability request message is determined according to the predetermined position time.

For specific implementation forms of the above steps 101 and 102, reference may be made to the detailed descriptions of other embodiments of the present disclosure, which will not be described again here.

In step 103, the terminal device capability request message is sent to a terminal device, in which the terminal device capability request message includes time information configured to indicate the terminal device to return response information.

The time information may be a moment or may be a time duration, which is not limited in the present disclosure.

The terminal device capability request message is a message that is sent by the core network device to the terminal device, and used to obtain positioning capability information of the terminal device. The core network device may send the terminal device capability request message to the terminal device via an LPP message.

In step 104, the positioning capability information of the terminal device returned by the terminal device within a time indicated by the time information is received.

The terminal device may use the LPP message to return the positioning capability information of the terminal device to the core network device.

By implementing embodiments of the present disclosure, the core network device determines the time information corresponding to the terminal device capability request message according to a received positioning request message containing the predetermined position time, and the core network device sends a terminal device capability request message containing the time information to the terminal device, and receives the positioning capability information of the terminal device returned by the terminal device within the time indicated by the time information. Therefore, the core network device may complete positioning preparation works within the predetermined position time, and reduce a positioning delay.

Referring to FIG. 11, which is a schematic flowchart of another positioning method provided by embodiments of the present disclosure, the method is performed by an access network device. As shown in FIG. 11, the method may include, but is not limited to, a following step.

In step 111, a positioning message is received, in which the positioning message includes time information configured to indicate to return response information.

The positioning message is sent by a core network device to the access network device.

In some embodiments, the positioning message is any one of the following messages: a positioning information request message, a positioning measurement result request message, and a positioning activation request message.

In some embodiments, the time information is a moment or a time duration.

In some embodiments, the time information is the moment, and the access network device returns the response information before a corresponding moment.

For example, if the time information is moment $t_i$, the access network device needs to return the response information before the moment $t_i$.

In some embodiments, the time information is the time duration, and the access network device starts a first timer in response to receiving the positioning message; and returns the response information before a timing value of the first timer reaches the time duration.

For example, if the time information is a time duration $t_a$, and a moment when the access network device receives the positioning message is $t_b$, the access network device needs to start the first timer at the moment $t_b$, and returns the response information before the timing value of the first timer reaches the time duration $t_a$, that is, before moment $t_b+t_a$.

By implementing embodiments of the present disclosure, the access network device receives the positioning message sent by the core network device and returns the response information within a time indicated by the time information. As a result, the access network device returns the response information within a time specified by the time information, so that the core network device may complete positioning preparation works within a prescribed time range and reduce a positioning delay.

Figures 12, 13, 14:
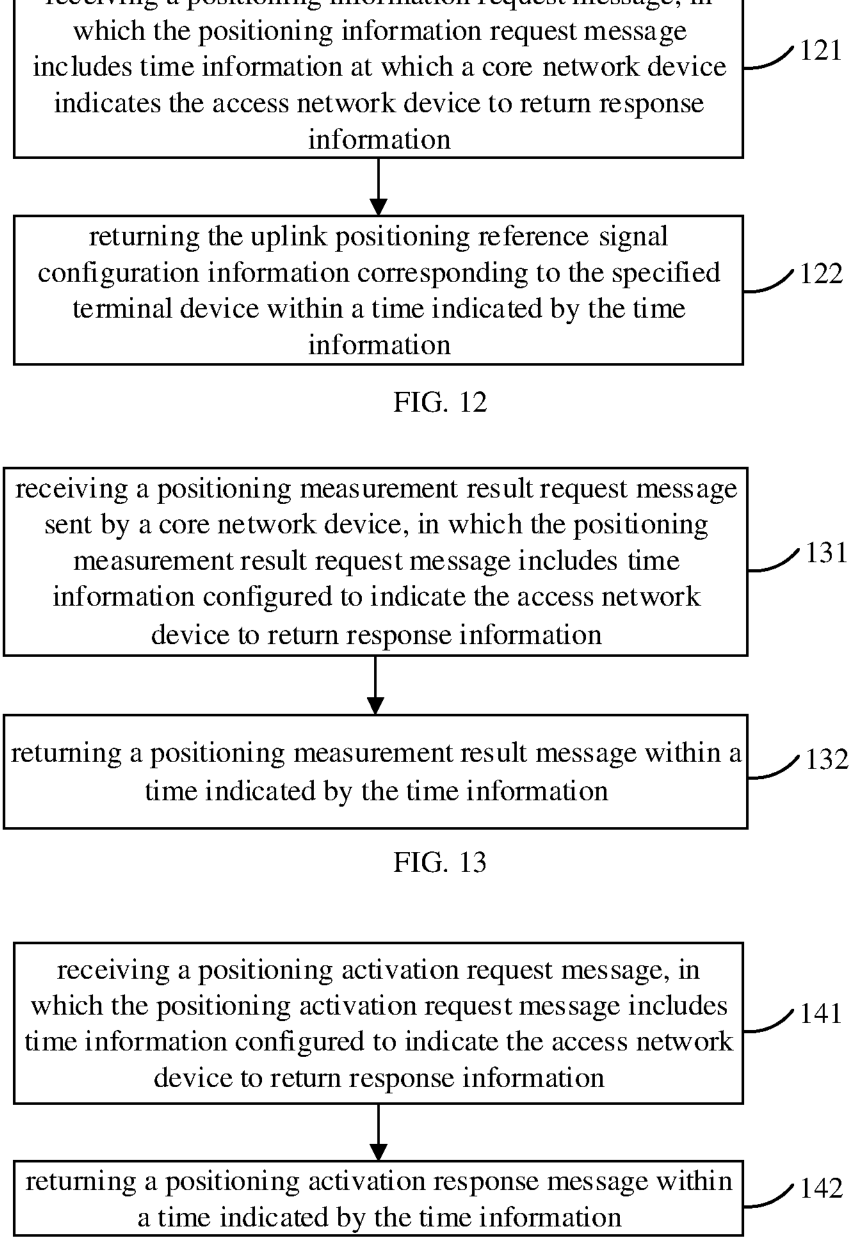
FIG. 12 is a schematic flowchart of a positioning method provided by embodiments of the present disclosure.
FIG. 13 is a schematic flowchart of a positioning method provided by embodiments of the present disclosure.
FIG. 14 is a schematic flowchart of a positioning method provided by embodiments of the present disclosure.

Referring to FIG. 12, which is a schematic flowchart of another positioning method provided by embodiments of the present disclosure, the method is performed by an access network device. As shown in FIG. 12, the method may include, but is not limited to, the following steps.

In step 121, a positioning information request message is received, in which the positioning information request message includes time information at which a core network device indicates the access network device to return response information.

The time information may be a moment or may be a time duration, which is not limited in the present disclosure.

The positioning information request message is a message that is sent by the core network device to the access network device, and used to obtain uplink positioning reference signal configuration information corresponding to a specified terminal device.

In step 122, the uplink positioning reference signal configuration information corresponding to the specified terminal device is returned within a time indicated by the time information.

The specified terminal device is a terminal device indicated in the positioning information request message.

After receiving the positioning information request message sent by the core network device, the access network device needs to determine the uplink positioning reference signal configuration information corresponding to the specified terminal device, and return the uplink positioning reference signal configuration information corresponding to the specified terminal device within the time indicated by the time information.

The access network device may return the uplink positioning reference signal configuration information corresponding to the specified terminal device to the core network device via an NRPPa message.

By implementing embodiments of the present disclosure, the access network device receives the positioning information request message sent by the core network device, and returns the uplink positioning reference signal configuration information corresponding to the specified terminal device within the time indicated by the time information. As a result, the core network device may complete positioning preparation works within a prescribed time range, and reduce a positioning delay.

Referring to FIG. 13, which is a schematic flowchart of another positioning method provided by embodiments of the present disclosure, the method is performed by an access network device. As shown in FIG. 13, the method may include, but is not limited to, the following steps.

In step 131, a positioning measurement result request message sent by a core network device is received, in which the positioning measurement result request message includes time information configured to indicate the access network device to return response information.

The time information may be a moment or may be a time duration, which is not limited in the present disclosure.

The positioning measurement result request message is a message that is sent by the core network device to the access network device, and used to obtain an uplink positioning reference signal measurement result.

In step 132, a positioning measurement result message is returned to the core network device within a time indicated by the time information.

By implementing embodiments of the present disclosure, the access network device receives a positioning measurement result request message containing the time information sent by the core network device, and returns the positioning measurement result message within the time indicated by the time information. Therefore, the core network device may complete positioning preparation works within a predetermined position time, and reduce a positioning delay.

Referring to FIG. 14, which is a schematic flowchart of another positioning method provided by embodiments of the present disclosure, the method is performed by an access network device. As shown in FIG. 14, the method may include, but is not limited to, the following steps.

In step 141, a positioning activation request message is received, in which the positioning activation request message includes time information configured to indicate the access network device to return response information.

The positioning activation request message is a message that is sent by a core network device to the access network device, and used to trigger the access network device to send an activation indication to a terminal device to activate an uplink positioning reference signal specified in the terminal device, or indicate the access network device to send a deactivation indication to a terminal device to deactivate an uplink positioning reference signal specified in the terminal device, in case that uplink positioning reference signal configuration information obtained by the core network device is aperiodic or semi-persistent.

In step 142, a positioning activation response message is returned within a time indicated by the time information.

The positioning activation response message is a message that is returned by the access network device to the core network device, and used to feed back whether to activate or deactivate the uplink positioning reference signal specified in the terminal device. The access network device may return the positioning activation response message to the core network device via an NRPPa message.

By implementing embodiments of the present disclosure, the access network device receives the positioning activation request message sent by the core network device, and returns the positioning activation response message within the time indicated by the time information. As a result, the core network device may complete positioning preparation works within a prescribed time range, and reduce a positioning delay.

Figures 15, 16, 17:
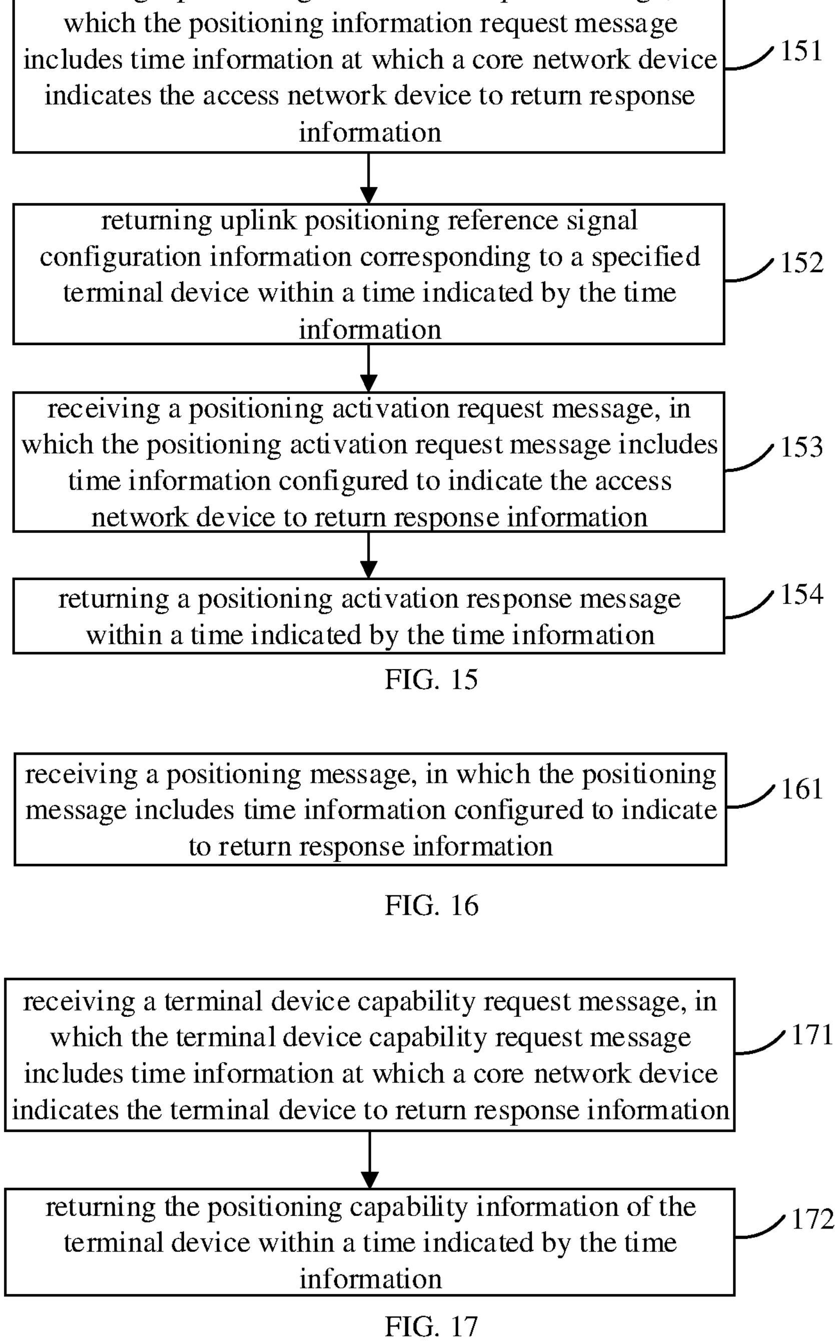
FIG. 15 is a schematic flowchart of a positioning method provided by embodiments of the present disclosure.
FIG. 16 is a schematic flowchart of a positioning method provided by embodiments of the present disclosure.
FIG. 17 is a schematic flowchart of a positioning method provided by embodiments of the present disclosure.

Referring to FIG. 15, which is a schematic flowchart of another positioning method provided by embodiments of the present disclosure, the method is performed by an access network device. As shown in FIG. 15, the method may include, but is not limited to, the following steps.

In step 151, a positioning information request message is received, in which the positioning information request message includes time information at which a core network device indicates the access network device to return response information.

In step 152, uplink positioning reference signal configuration information corresponding to a specified terminal device is returned within a time indicated by the time information, in which the specified terminal device is a terminal device indicated in the positioning information request message.

For specific implementation forms of the above steps 151 and 152, reference may be made to the detailed descriptions of other embodiments of the present disclosure, which will not be described again here.

In step 153, a positioning activation request message is received, in which the positioning activation request message includes time information configured to indicate the access network device to return response information.

The positioning activation request message is a message that is sent by the core network device to the access network device, and used to trigger the access network device to send an activation indication to the terminal device to activate an uplink positioning reference signal specified in the terminal device, or indicate the access network device to send a deactivation indication to the terminal device to deactivate an uplink positioning reference signal specified in the terminal device, in case that uplink positioning reference signal configuration information obtained by the core network device is aperiodic or semi-persistent.

In step 154, a positioning activation response message is returned within a time indicated by the time information.

The positioning activation response message is a message that is returned by the access network device to the core network device, and used to feed back whether to activate or deactivate the uplink positioning reference signal specified in the terminal device. The access network device may return the positioning activation response message to the core network device via an NRPPa message.

By implementing embodiments of the present disclosure, the access network device receives the positioning information request message and returns the uplink positioning reference signal configuration information corresponding to the specified terminal device within the time indicated by the time information, and if the uplink positioning reference signal configuration information is an aperiodic or semi-persistent positioning reference signal, the access network device receives the positioning activation request message, and returns the positioning activation response message within the time indicated by the time information. As a result, the core network device may complete positioning preparation works within a prescribed time range, and reduce a positioning delay.

Referring to FIG. 16, which is a schematic flowchart of another positioning method provided by embodiments of the present disclosure, the method is performed by a terminal device. As shown in FIG. 16, the method may include, but is not limited to, a following step.

In step 161, a positioning message is received, in which the positioning message includes time information configured to indicate to return response information.

The positioning message is sent by a core network device to the terminal device.

In some embodiments, the positioning message is a terminal device capability request message.

In some embodiments, the time information is a moment or a time duration.

In some embodiments, the time information is the moment, and the terminal device returns the response information before a corresponding moment.

For example, if the time information is moment $t_c$, the terminal device needs to return the response information before the moment $t_c$.

In some embodiments, the time information is the time duration, and the terminal device starts a first timer in response to receiving the positioning message; and returns the response information before a timing value of the first timer reaches the time duration.

For example, if the time information is a time duration $t_d$, and a moment when the terminal device receives the positioning message is $t_e$, the terminal device needs to start the first timer at the moment $t_e$, and returns the response information before the timing value of the first timer reaches the time duration $t_d$, that is, before moment $t_e+t_d$.

By implementing embodiments of the present disclosure, the terminal device receives the positioning message and returns the response information within a time indicated by the time information. As a result, the core network device completes positioning preparation works within a prescribed time range and reduces a positioning delay.

Referring to FIG. 17, which is a schematic flowchart of another positioning method provided by embodiments of the present disclosure, the method is performed by a terminal device. As shown in FIG. 17, the method may include, but is not limited to, the following steps.

In step 171, a terminal device capability request message is received, in which the terminal device capability request message includes time information at which a core network device indicates the terminal device to return response information.

The time information may be a moment or may be a time duration, which is not limited in the present disclosure.

The terminal device capability request message is sent by the core network device to the terminal device and is used to obtain positioning capability information of the terminal device. The core network device may send the terminal device capability request message to the terminal device via an LPP message.

In step 172, the positioning capability information of the terminal device is returned within a time indicated by the time information.

For example, if the time information is the moment, the terminal device needs to return the positioning capability information of the terminal device to the core network device via the LPP message before the moment. Alternatively, if the time information is the time duration, the terminal device needs to start a first timer when receiving the terminal device capability request message, and return the positioning capability information of the terminal device before a timing value of the first timer reaches the time duration.

By implementing embodiments of the present disclosure, the terminal device receives the terminal device capability request message and returns the positioning capability information of the terminal device within the time indicated by the time information. As a result, the core network device completes positioning preparation works within a prescribed time range, and reduces a positioning delay.

In the above embodiments provided by the present disclosure, the methods provided in embodiments of the present disclosure are introduced from perspectives of the core network device, the access network device and the terminal device respectively. In order to implement the various functions in the methods provided by the above embodiments of the present disclosure, the core network device, the access network device and the terminal device may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

Figure 18:
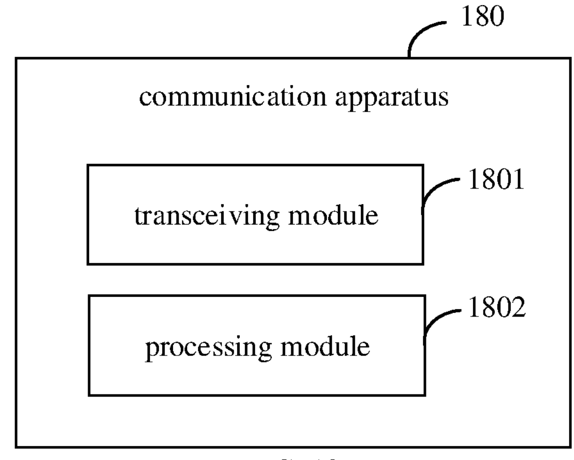
FIG. 18 is a schematic block diagram of a communication apparatus provided by embodiments of the present disclosure.

Referring to FIG. 18, which is a schematic block diagram of a communication apparatus 180 provided by embodiments of the present disclosure, the communication apparatus 180 shown in FIG. 18 may include a transceiving module 1801 and a processing module 1802. The transceiving module 1801 may include a sending module and/or a receiving module, the sending module is configured to implement a sending function, and the receiving module is configured to implement a receiving function. The transceiving module 1801 may implement the sending function and/or the receiving function.

The communication apparatus 180 may be a core network device (such as the core network device in the foregoing method embodiments), an apparatus in the core network device, or an apparatus that can be used in conjunction with the core network device. Alternatively, the communication apparatus 180 may be an access network device (such as the access network device in the foregoing method embodiments), an apparatus in the access network device, or an apparatus that can be used in conjunction with the access network device. Alternatively, the communication apparatus 180 may also be a terminal device, an apparatus in the terminal device, or an apparatus that can be used in conjunction with the terminal device.

Specifically, if the communication apparatus 180 is a core network device (such as the core network device in the aforementioned method embodiments):

the transceiving module 1801 is configured to send a positioning message. The positioning message includes time information configured to indicate to return response information.

In some embodiments, the transceiving module 1801 is specifically configured to:

send the positioning message to an access network device; or send the positioning message to a terminal device.

In some embodiments, the time information is any one of: a moment or a time duration.

In some embodiments, the positioning message is any one of following messages:

a terminal device capability request message;

a positioning measurement result request message;

a positioning information request message; and a positioning activation request message.

In some embodiments, the transceiving module 1801 is specifically configured to:

receive a positioning request message, in which the positioning request message includes a predetermined position time.

In some embodiments, the communication apparatus 180 further includes the processing module 1802, which is configured to determine the time information according to the predetermined position time.

In some embodiments, the transceiving module 1801 is further configured to:

determine the time information according to the predetermined position time and a moment when the positioning request message is received.

In some embodiments, the transceiving module 1801 is further configured to:

determine the time information according to the predetermined position time and a type of the positioning message.

In the communication apparatus provided by the present disclosure, the core network device sends a positioning message containing the time information to the access network device and the terminal device, so that the access network device and the terminal device return the response information to the core network device within a time indicated by the time information. Therefore, the core network device completes positioning preparation works within a prescribed time range, and reduces a positioning delay.

Alternatively, if the communication apparatus 180 is an access network device:

the transceiving module 1801 is configured to receive a positioning message. The positioning message includes time information configured to indicate to return response information.

In some embodiments, the time information is a moment or a time duration.

In some embodiments, the time information is the moment, and the transceiving module 1801 is specifically configured to:

return the response information before the moment.

In some embodiments, the time information is the time duration, and the transceiving module 1801 is specifically configured to:

in response to receiving the positioning message, start a first timer; and return the response information before a timing value of the first timer reaches the time duration.

In some embodiments, the positioning message is any one of following messages: a positioning information request message, a positioning measurement result request message, and a positioning activation request message.

In some embodiments, the positioning message is the positioning information request message, and the transceiving module 1801 is specifically configured to:

within a time indicated by the time information, return uplink positioning reference signal configuration information corresponding to a specified terminal device, in which the specified terminal device is a terminal device indicated in the positioning information request message.

In some embodiments, the positioning message is the positioning activation request message, and the transceiving module 1801 is specifically configured to:

within a time indicated by the time information, return a positioning activation response message.

In the communication apparatus provided by the present disclosure, the access network device receives a positioning message sent by the core network device and returns the response information within the time indicated by the time information. As a result, the core network device completes positioning preparation works within a prescribed time range, and reduces a positioning delay.

Therefore, the core network device completes the positioning preparation works within the prescribed time range, and reduces the positioning delay.

Alternatively, if the communication apparatus 180 is a terminal device:

the transceiving module 1801 is configured to receive a positioning message. The positioning message includes time information configured to indicate to return response information.

In some embodiments, the time information is a moment or a time duration.

In some embodiments, the time information is the moment, and the transceiving module 1801 is specifically configured to:

return the response information before the moment.

In some embodiments, the time information is the time duration, and the transceiving module 1801 is specifically configured to:

in response to receiving the positioning message, start a first timer; and return the response information before a timing value of the first timer reaches the time duration.

In some embodiments, the positioning message is a terminal device capability request message, and the transceiving module 1801 is specifically configured to:

within a time indicated by the time information, return positioning capability information of the terminal device.

Through the communication apparatus provided by the present disclosure, the terminal device receives the terminal device capability request message and returns the positioning capability information of the terminal device within the time indicated by the time information. As a result, the core network device completes positioning preparation works within a prescribed time range, and reduces a positioning delay.

Figure 19:
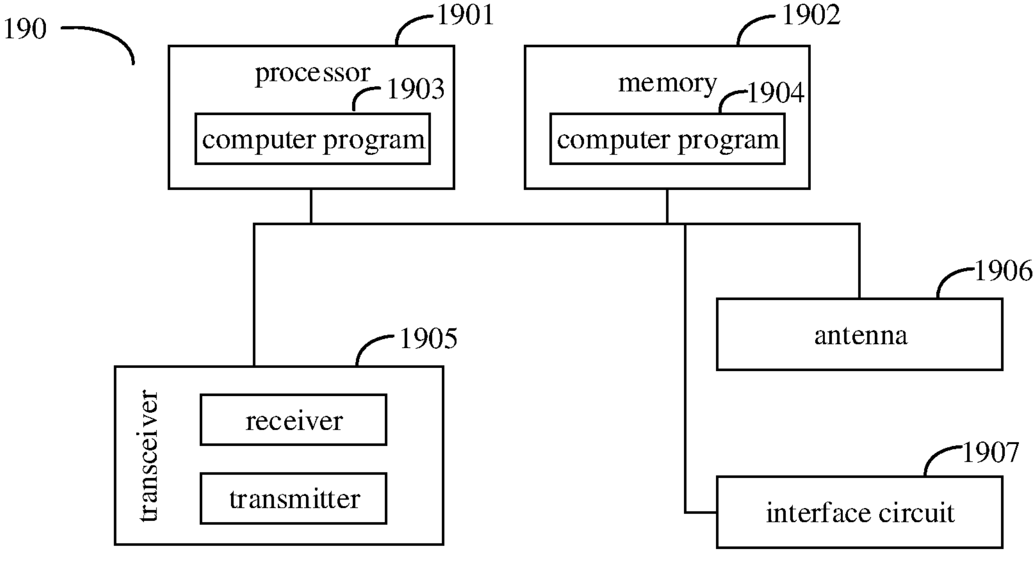
FIG. 19 is a schematic block diagram of another communication device provided by embodiments of the present disclosure.

Referring to FIG. 19, which is a schematic block diagram of another communication device 190 provided by embodiments of the present disclosure, the communication device 190 may be a network device, may also be a terminal device (such as the terminal device in the foregoing method embodiments), may also be a chip, a chip system, or a processor that supports the network device to implement the above methods, and may also be a chip, a chip system, or a processor that supports the terminal device to implement the above methods. The device may be configured to implement the methods as described in the above method embodiments, and for details, reference may be made to the descriptions in the above method embodiments.

The communications device 190 may include one or more processors 1901. The processor 1901 may be a general-purpose processor or a special-purpose processor. For example, it may be a baseband processor or a central processing unit. The baseband processor may be configured to process a communication protocol and communication data, and the central processing unit may be configured to control a communication device (such as a base station, a baseband chip, the terminal device, a terminal device chip, a DU or a CU, etc.) execute computer programs, and process data of computer programs.

In some embodiments, the communication device 190 may further include one or more memories 1902 having stored therein a computer program 1904. The processor 1901 executes the computer program 1904, to cause the communication device 190 to implement the methods as described in the above method embodiments. In some embodiments, the memory 1902 may have stored therein data. The communication device 190 and the memory 1902 may be provided separately or integrated together.

In some embodiments, the communication device 190 may further include a transceiver 1905 and an antenna 1906. The transceiver 1905 may be called a transceiving element, a transceiving machine, a transceiving circuit or the like, for implementing a transceiving function. The transceiver 1905 may include a receiver and a transmitter. The receiver may be called a receiving machine, a receiving circuit or the like, for implementing a receiving function. The transmitter may be called a sending machine, a sending circuit or the like, for implementing a sending function.

In some embodiments, the communication device 190 may further include one or more interface circuits 1907. The interface circuit 1907 is configured to receive a code instruction and transmit the code instruction to the processor 1901. The processor 1901 runs the code instruction to enable the communication device 190 to execute the methods as described in the foregoing method embodiments.

The communication device 190 is the core network device (such as the core network device in the foregoing method embodiments): the transceiver 1905 is configured to execute the step 21 in FIG. 2, the step 31 and the step 33 in FIG. 3, the step 41, the step 42, the step 43 and the step 44 in FIG. 4, etc. The processor 1901 may be configured to execute the step 32 in FIG. 3, etc.

The communication device 190 is the access network device: the transceiver 1905 is configured to execute the step 111 in FIG. 11, the step 121 and the step 122 in FIG. 12, the step 131 and the step 132 in FIG. 13, etc.

The communication device 190 is the terminal device: the transceiver 1905 may be configured to execute the step 161 in FIG. 16, the step 171 and the step 172 in FIG. 17, etc.

In an implementation manner, the processor 1901 may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read or write codes/data, or the above transceiving circuit, interface or interface circuit may be configured to transmit or transfer signals.

In an implementation manner, the processor 1901 may have stored therein a computer program 1903 that, when run on the processor 1901, causes the communication device 190 to implement the methods as described in the foregoing method embodiments. The computer program 1903 may be embedded in the processor 1901, and in this case, the processor 1901 may be implemented by a hardware.

In an implementation manner, the communication device 190 may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), a negative metal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the network device or the terminal device (such as the terminal device in the foregoing method embodiments), but the scope of the communication device described in the present disclosure is not limited thereto, and a structure of the communication device is not limited by FIG. 19. The communication device may be a stand-alone device or may be a part of a larger device. For example, the communication device may be:

(1) a stand-alone integrated circuit (IC), or a chip, or a chip system or subsystem;

(2) a set of one or more ICs, In some embodiments, the set of ICs may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handheld machine, a mobile unit, a vehicle device, a network device, a cloud device, an artificial intelligence device, etc.;

(6) others.

Figure 20:
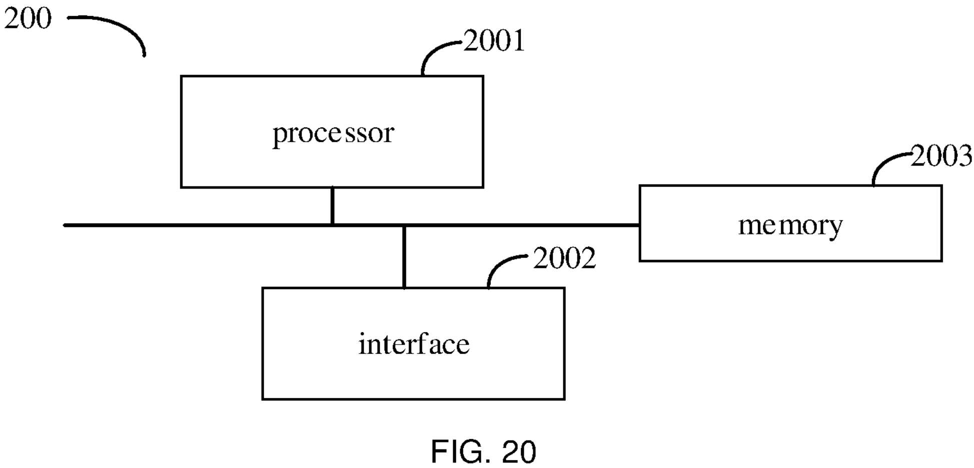
FIG. 20 is a schematic block diagram of a chip provided by embodiments of the present disclosure.

For the case where the communication device may be a chip or a chip system, reference may be made to a schematic diagram of the chip 200 shown in FIG. 20. The chip shown in FIG. 20 includes a processor 2001 and an interface 2002. In the chip, one or more processors 2001 may be provided, and more than one interface 2002 may be provided.

For the case where the chip is used to implement functions of the core network device in embodiments of the present disclosure:

the interface 2002 is configured to execute the step 21 in FIG. 2, the step 31, the step 32 and the step 33 in FIG. 3, the step 41, the step 42, the step 43 and the step 44 in FIG. 4, etc.

For the case where the chip is used to implement functions of the access network device in embodiments of the present disclosure:

the interface 2002 is configured to execute the step 111 in FIG. 11, the step 121 and the step 122 in FIG. 12, the step 131 and the step 132 in FIG. 13, etc.

For the case where the chip is used to implement functions of the terminal device in embodiments of the present disclosure:

The interface 2002 is configured to execute the step 161 in FIG. 16, the step 171 and the step 172 in FIG. 17, etc.

In some embodiments, the chip further includes a memory 2003 for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such an implementation should not be understood as extending beyond the protection scope of embodiments of the present disclosure.

Embodiments of the present disclosure also provide a positioning system. The system includes the communication apparatus as the terminal device and the communication apparatus as the network device as described in the aforementioned embodiments in FIG. 14, or the system includes the communication device as the terminal device and the communication device as the network device as described in the aforementioned embodiments in FIG. 10.

The present disclosure also provides a readable storage medium having stored thereon instructions that, when executed by a computer, cause functions of any of the above method embodiments to be implemented.

The present disclosure also provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or some of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website, computer, server or data center to another website, computer, server or data center in a wired manner (such as via a coaxial cable, an optical fiber, a digital subscriber line (DSL)) or a wireless manner (such as infrared, wireless, or via microwave, etc.). The computer-readable storage medium may be any available medium that can be accessed by the computer, or a data storage device such as the server or the data center integrated with one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)), etc.

Those of ordinary skill in the art can understand that the first, second, and other numeral numbers involved in the present disclosure are distinguished only for convenience of description, and are not intended to limit the scope of embodiments of the present disclosure, and nor are they intended to represent sequential order.

The term "at least one" used in the present disclosure may also be described as one or more, and the term "a plurality of" may cover two, three, four or more, which are not limited in the present disclosure. In embodiments of the present disclosure, for a certain kind of technical feature, the technical features in this kind of technical feature are distinguished by term like "first", "second", "third", "A", "B", "C" and "D", etc., and these technical features described with the "first", "second", "third", "A", "B", "C" and "D" have no order of priority and have no order of size.

The correspondence shown in each table in the present disclosure may be configured or predefined. The values of information in each table are just examples, and may be configured as other values, which are not limited in the present disclosure. When configuring a correspondence between the information and various parameters, it is not necessary to configure all the correspondences shown in the tables. For example, the correspondences shown in some rows of the tables in the present disclosure may not be configured. For another example, appropriate variations or adjustments (such as splitting, merging, and so on) can be made based on the above table. The names of parameters shown in the titles of the above tables may also adopt other names understandable in the communication device, and the values or representations of the parameters may also be other values or representations understandable in the communication device. When the above tables are implemented, other data structures may also be used, for example, arrays, queues, containers, stacks, linear tables, pointers, linked lists, trees, graphs, structural bodies, classes, heaps, or hash tables may be used.

The term "predefinition" in the present disclosure may be understood as definition, pre-definition, storage, pre-storage, pre-negotiation, pre-configuration, curing, or pre-firing.

Those of ordinary skill in the art can appreciate that the units and algorithm steps of various examples described in conjunction with embodiments disclosed herein may be implemented by the electronic hardware, or a combination of the computer software and the electronic hardware. Whether these functions are executed by the hardware or the software depends on the specific applications and design constraints of the technical solution. For each particular application, those skilled in the art may use different methods to implement the described functions, but such an implementation should not be considered as extending beyond the scope of the present disclosure.

Those skilled in the art can clearly understand that for the convenience and brevity of the description, for the specific working process of the above-described system, device and unit, reference may be made to the corresponding process in the foregoing method embodiments, which will not be repeated here.

The above only describes some specific implementations of the present disclosure, but the protection scope of the present disclosure is not limited thereto. Any changes or substitutions that are conceivable to those skilled in the art within the technical scope of the present disclosure should fall within the protection scope of the present disclosure. Therefore, the protection scope of the present disclosure should be determined by the protection scope of the claims.

What is claimed is:

1. A positioning method, performed by a core network device and comprising:

receiving, by the core network device, a positioning request message, wherein the positioning request message comprises a predetermined position time at which positioning measurement needs to be performed;

determining, by the core network device, according to the predetermined position time, time information configured to indicate when to return response information; and sending, by the core network device, a positioning message, wherein the positioning message comprises the time information.

2. The method according to claim 1, wherein sending the positioning message comprises:

sending the positioning message to an access network device; or sending the positioning message to a terminal device.

3. The method according to claim 1, wherein the time information is any one of: a moment or a time duration.

4. The method according to claim 1, wherein the positioning message is one of:

a positioning measurement result request message, indicating an access network device to return an uplink positioning reference signal measurement result to the core network device within a time indicated by the time information;

a positioning information request message, indicating an access network device to return uplink positioning reference signal configuration information corresponding to a specified terminal device to the core network device within a time indicated by the time information; or a positioning activation request message, indicating an access network device to return a positioning activation response message to the core network device within a time indicated by the time information.

5. The method according to claim 1, wherein determining the time information according to the predetermined position time comprises:

determining the time information according to the predetermined position time and a moment when the positioning request message is received.

6. The method according to claim 1, wherein determining the time information according to the predetermined position time comprises:

determining the time information according to the predetermined position time and a type of the positioning message.

7. The method according to claim 1, wherein the positioning message is a terminal device capability request message.

8. A positioning method, performed by an access network device and comprising:

receiving, by the access network device, a positioning message, wherein the positioning message comprises time information configured to indicate when to return response information, wherein the time information is determined according to a predetermined position time at which positioning measurement needs to be performed.

9. The method according to claim 8, wherein the time information is a moment or a time duration.

10. The method according to claim 9, wherein the time information is the moment, and the method further comprises:

returning the response information before the moment.

11. The method according to claim 9, wherein the time information is the time duration, and the method comprises:

in response to receiving the positioning message, starting a first timer; and returning the response information before a timing value of the first timer reaches the time duration.

12. The method according to claim 8, wherein the positioning message is one of:

a positioning information request message indicating the access network device to return uplink positioning reference signal configuration information corresponding to a specified terminal device to a core network device within a time indicated by the time information, a positioning measurement result request message indicating the access network device to return an uplink positioning reference signal measurement result to a core network device within a time indicated by the time information, or a positioning activation request message indicating the access network device to return a positioning activation response message to a core network device within a time indicated by the time information.

13. The method according to claim 12, wherein the positioning message is the positioning information request message, and the method further comprises:

within the time indicated by the time information, returning the uplink positioning reference signal configuration information corresponding to the specified terminal device to the core network device, wherein the specified terminal device is a terminal device indicated in the positioning information request message.

14. The method according to claim 12, wherein the positioning message is the positioning activation request message, and the method further comprises:

within the time indicated by the time information, returning the positioning activation response message to the core network device.

15. A positioning method, performed by a terminal device and comprising:

sending, by the terminal device, a positioning request message, wherein the positioning request message comprises a predetermined position time at which positioning measurement needs to be performed;

receiving, by the terminal device, a positioning message, wherein the positioning message comprises time information configured to indicate when to return response information;

wherein the time information is determined according to the predetermined position time.

16. The method according to claim 15, wherein the time information is a moment or a time duration.

17. The method according to claim 16, wherein the time information is the moment, and the method further comprises:

returning the response information before the moment.

18. The method according to claim 16, wherein the time information is the time duration, and the method comprises:

in response to receiving the positioning message, starting a first timer; and returning the response information before a timing value of the first timer reaches the time duration.

19. The method according to claim 15, wherein the positioning message is a terminal device capability request message, and the method further comprises:

within a time indicated by the time information, returning positioning capability information of the terminal device.

* * * * *